United States Patent
Oh et al.

(10) Patent No.: US 11,407,402 B2
(45) Date of Patent: Aug. 9, 2022

(54) DRIVING TORQUE COMMAND GENERATING APPARATUS AND METHOD OF OPERATING HYBRID ELECTRIC VEHICLE

(71) Applicants: Hyundai Motor Company, Seoul (KR); Kia Motors Corporation, Seoul (KR)

(72) Inventors: Ji Won Oh, Gyeonggi-do (KR); Young Joon Chang, Gyeonggi-do (KR); Jeong Soo Eo, Gyeonggi-do (KR); Youn Kwang Jung, Gyeonggi-Do (KR); Sung Jae Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 281 days.

(21) Appl. No.: 16/592,313

(22) Filed: Oct. 3, 2019

(65) Prior Publication Data
US 2020/0130672 A1 Apr. 30, 2020

(30) Foreign Application Priority Data
Oct. 31, 2018 (KR) .................. 10-2018-0131488

(51) Int. Cl.
*B60W 20/17* (2016.01)
*B60W 10/06* (2006.01)
(Continued)

(52) U.S. Cl.
CPC ............ *B60W 20/17* (2016.01); *B60W 10/06* (2013.01); *B60W 10/08* (2013.01); *B60W 30/20* (2013.01);
(Continued)

(58) Field of Classification Search
CPC ...... B60W 20/17; B60W 10/06; B60W 10/08; B60W 30/20; B60W 2710/083; B60W 2510/081; B60W 2520/28; B60W 2710/0666; B60W 2540/10; B60W 50/0098; B60W 2050/0041; B60W 20/15; B60W 20/11; B60W 2050/0012; B60W 20/00; B60W 2510/0638; B60W 40/00; B60W 2510/0657; B60W 2510/083;
(Continued)

(56) References Cited

U.S. PATENT DOCUMENTS

| 2010/0114424 A1* | 5/2010 | Morris | B60W 30/20 701/51 |
| 2019/0360320 A1* | 11/2019 | Hohl | G01L 5/10 |
| 2020/0259431 A1* | 8/2020 | Sawada | H02P 5/46 |

FOREIGN PATENT DOCUMENTS

KR 101795285 B1 11/2017

* cited by examiner

*Primary Examiner* — Hunter B Lonsberry
*Assistant Examiner* — Jimin You
(74) *Attorney, Agent, or Firm* — Fox Rothschild LLP (57) ABSTRACT

A driving torque command generating apparatus and method of operating a hybrid electric vehicle can obtain torsional state observation values using an engine speed, a motor speed, and a wheel speed detected by an engine speed detector, a motor speed detector, and a wheel speed detector, respectively, together with a motor torque command generated in a previous period, and generate an engine torque command and a motor torque command of a driving torque command based on a driving input value input by a driving input detector and the torsional state observation values.

14 Claims, 6 Drawing Sheets

(51) Int. Cl.
*B60W 10/08* (2006.01)
*B60W 30/20* (2006.01)

(52) U.S. Cl.
CPC ............... *B60W 2510/0638* (2013.01); *B60W 2510/081* (2013.01); *B60W 2520/28* (2013.01); *B60W 2540/10* (2013.01); *B60W 2710/0666* (2013.01); *B60W 2710/083* (2013.01)

(58) Field of Classification Search
CPC ..... Y02T 10/40; Y02T 10/62; B60Y 2200/92; B60Y 2400/3032
See application file for complete search history.

DRIVING TORQUE COMMAND GENERATING APPARATUS AND METHOD OF OPERATING HYBRID ELECTRIC VEHICLE

CROSS REFERENCE TO RELATED APPLICATION

The present application claims under 35 U.S.C. § 119(a) the benefit of Korean Patent Application No. 10-2018-0131488, filed Oct. 31, 2018, the entire contents of which are incorporated by reference herein.

BACKGROUND

(a) Technical Field

The present disclosure relates generally to a driving torque command generating apparatus and method of operating a hybrid electric vehicle, more particularly, to the driving torque command generating apparatus and method capable of obtaining a rapid reaction in response to a driving input of a driver while effectively reducing noise, vibration, and harshness (NVH) problems caused by torsion and backlash of a drive system.

(b) Description of the Related Art

Hybrid electric vehicles (HEVs) are vehicles propelled by an engine and a motor. HEVs can be propelled by efficiently combining the power of the engine and the power of the motor.

Figure 1:
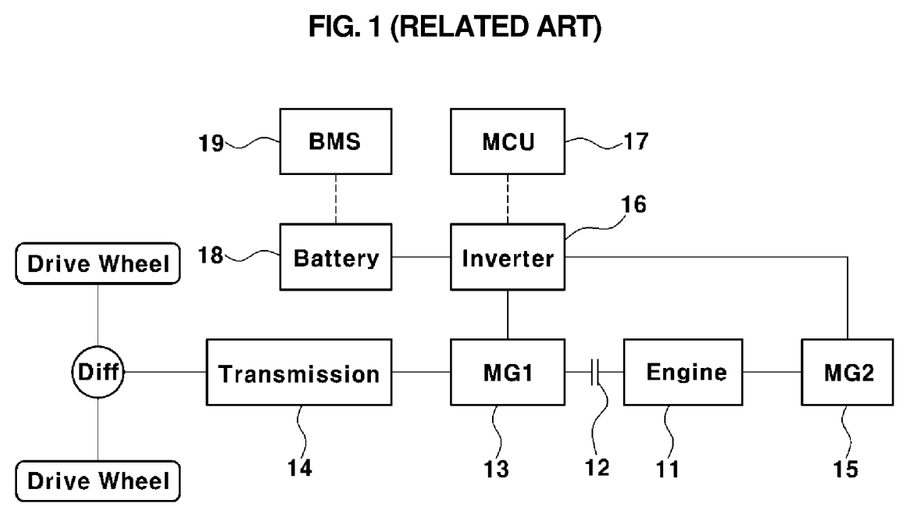
FIG. 1 (RELATED ART) is a system configuration diagram of a typical hybrid electric vehicle (HEV)

FIG. 1 (RELATED ART) illustrates a configuration of a hybrid system of an HEV, and more particularly, a powertrain configuration of a transmission mounted electric device (TMED) HEV, in which a transmission 14 is disposed on an output side of a driving motor (MG1) 13.

As illustrated in FIG. 1, the hybrid system includes an engine 11 and a drive motor 13 disposed in series as power sources for propelling the vehicle, an engine clutch 12 configured to connect or disconnect power between the engine 11 and the drive motor 13, a transmission 14 transmitting power from the engine 11 and the drive motor 13 to a drive shaft by a speed conversion, and a starter-generator (MG2) 15 directly connected to the engine 11 in a power transmittable manner.

In addition to this configuration, an inverter 16 and a motor control unit (MCU) 17 operating and controlling the drive motor 13, a high-voltage battery 18 supplying operating power to the drive motor 13, and a battery management system (BMS) 19 controlling and managing the battery 18 are provided.

In this configuration, the engine clutch 12 connects or disconnects power between the engine 11 and the drive motor 13 of the vehicle through a closing or opening operation.

In addition, the battery 18 serving as a source of propulsion (or power source) of the vehicle is chargeably/dischargeably connected to the drive motor 13 and the starter-generator 15 via the inverter 16. The inverter 16 transforms direct current (DC) of the battery 18 to three-phase alternating current (AC) and applies the three-phase AC to the drive motor 13 and the starter-generator 15 in order to operate the drive motor 13 and the starter-generator 15.

The starter-generator 15 is a device performing a combined function of a starter motor and a generator. The starter-generator 15 starts the engine 11 by transferring power there from to the engine 11 via a power transfer device (e.g., a belt or a pulley), generates electric energy using torque received from the engine, or charges the battery 18 with electric energy generated thereby when generating electricity.

The BMS 19 collects battery status information, such as a voltage, current, a temperature, a state of charge (SOC, in %) of the battery 18. The BMS 19 provides the battery status information collected to the other controllers in the vehicle or uses the battery status information collected for charge/discharge control over the battery 18.

In addition, the response of the vehicle to a driving input of the driver, such as a manipulation of the accelerator pedal or the brake pedal, and the ability to reduce noise, vibration, and harshness (NVH) problems caused by a significant change in driving force are in a trade-off relationship.

In addition, in relation to generating a driving torque command (or a driving force command) to a vehicle-driving source, for example, generating a torque command to the engine or a torque command to the drive motor in a vehicle, a rate limiter or a filter having a variety of conditions as parameters to generate an optimum torque command with which the above-described trade-off relationship can be removed is used.

However, the development of the rate limiter or the filter, in which a variety of conditions is considered, requires an excessive number of process steps, which is problematic.

Recently, a driving torque command is generated using a dual or diversified method, depending on a driving mode or conditions, in order to provide driving-customized control according to a driver's propensity. In this case, the number of process steps may be significantly increased depending on the number of diversified types, which is problematic.

Korean Patent No. 10-1795285 discloses an engine-motor vibration reducing apparatus and method for generating a reverse phase torque using a motor by extracting a vibration component based on an engine-side rotational speed and comparing the vibration component with a motor-side rotational speed.

The apparatus and method according to Korean Patent No. 10-1795285 may actively reduce vibration produced by explosion of an engine by directly adjusting a phase in a frequency range.

However, the method disclosed in Korean Patent No. 10-1795285 can only process a frequency corresponding to vibration caused by engine explosion, but does not include any capability of responding to NVH problems produced by driving inputs of the driver. It is therefore difficult to perform a control process for reducing the torsion of a torsional damper and reducing the backlash of a drive system.

In addition, since reverse phase control is performed only in the frequency range, but not in a time range, the torsion of the torsional damper produced by the driving input of the driver cannot be reduced in the time range.

Real-time reverse phase control must be performed to enable such reduction. However, it is difficult to perform the real-time reverse phase control, since the torque tracking ability of the engine is insufficient.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a driving torque command generating apparatus and method of operating a hybrid electric vehicle (HEV), the apparatus and method being able to obtain rapid reaction of a vehicle in response to a driving input of a driver while effectively reducing noise, vibration, and harshness (NVH) problems caused by torsion and backlash of a drive system, e.g., even in the case in which a significant change in driving force is caused by the driving input of the driver.

According to one aspect of the present disclosure, a driving torque command generating apparatus of a hybrid electric vehicle includes: a driving input detector detecting a driving input value of a driver, including a pedal input value in response to manipulation of an accelerator pedal; an engine speed detector detecting an engine speed of an engine of a vehicle; a motor speed detector detecting a motor speed of a motor functioning as a driving source of the vehicle; a wheel speed detector detecting a wheel speed of a wheel of the vehicle; and a controller obtaining torsional state observation values using a measured engine speed, a measured motor speed, and a measured wheel speed detected by the engine speed detector, the motor speed detector, and the wheel speed detector, respectively, together with a motor torque command generated in a previous period, and generating an engine torque command and a motor torque command of a driving torque command based on the driving input value input by the driving input detector and the torsional state observation values.

According to another aspect of the present disclosure, a driving torque command generating method of a hybrid electric vehicle includes: detecting, by a driving input detector, a driving input value of a driver, including a pedal input value in response to manipulation of an accelerator pedal; detecting, by an engine speed detector, an engine speed of an engine of a vehicle; detecting, by a motor speed detector, a motor speed of a motor functioning as a driving source of the vehicle; detecting, a wheel speed detector, a wheel speed of a wheel of the vehicle; and obtaining, by a controller, torsional state observation values using a measured engine speed, a measured motor speed, and a measured wheel speed detected by the engine speed detector, the motor speed detector, and the wheel speed detector, respectively, together with a motor torque command generated in a previous period; and generating, by the controller, an engine torque command and a motor torque command of a driving torque command based on the driving input value input by the driving input detector and the torsional state observation values.

According to the present disclosure, the driving torque command generating apparatus and method of an HEV can obtain rapid reaction of a vehicle in response to the driving input of the driver (e.g., manipulation of the accelerator pedal by the driver) while effectively reducing NVH problems caused by torsion and backlash of the drive system even in the case in which a significant change in driving force is caused by the driving input.

In addition, according to the present disclosure, in the case of overcoming NVH problems caused by torsion and backlash of the drive system, it is possible to overcome the difficulty in setting the torque command filter or torque gradient in a situation-specific manner by considering a number of factors, as well as the excessive number of process steps, which are the problems of the related-art solutions using the rate limiter or the filter. In addition, since a torque command suitable for a specific point in time can be generated in real time, an improvement in efficiency can be expected.

In particular, according to the present disclosure, it is possible to generate a driving torque command by previously observing a result of backlash or vibration of the drive system depending on a change in torque before the torque is actually generated, thereby effectively reducing NVH problems even in the case in which a unique control delay time is present in the engine or the motor.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings so that a person having ordinary skill in the art to which the present disclosure relates could easily put the present disclosure into practice. However, the present disclosure is not limited to the embodiments described herein and may be embodied in other forms.

A torsional damper integrated with a flywheel is present between vehicle-driving sources, i.e., an engine and a drive motor (hereinafter, abbreviated as a "motor"), to act to dampen engine vibration.

However, a sudden change in engine torque or motor torque causes an excessive torsion to the damper, thereby creating noise, vibration, and harshness (NVH) problems in a drive system. In order to overcome such problems, a limiting means, such as a rate limiter or a filter, is used to limit the rate of change of the engine torque or the motor torque (or the rate of change of a torque command).

That is, a rate limiter or a filter having a variety of conditions as parameters is used in hybrid electric vehicles (HEVs) to generate an optimum driving torque command (or a driving force command) with which the problems caused by torsion of the drive system can be removed.

However, such a method of limiting a rate of change (i.e., gradient) does not provide a rapid response. Accordingly, there is a significant difference between a vehicle behavior expected by a driver and an actual vehicle behavior. In addition, there may be a lag or delay in acceleration or deceleration response, thereby degrading drivability, which is problematic.

Figure 2:
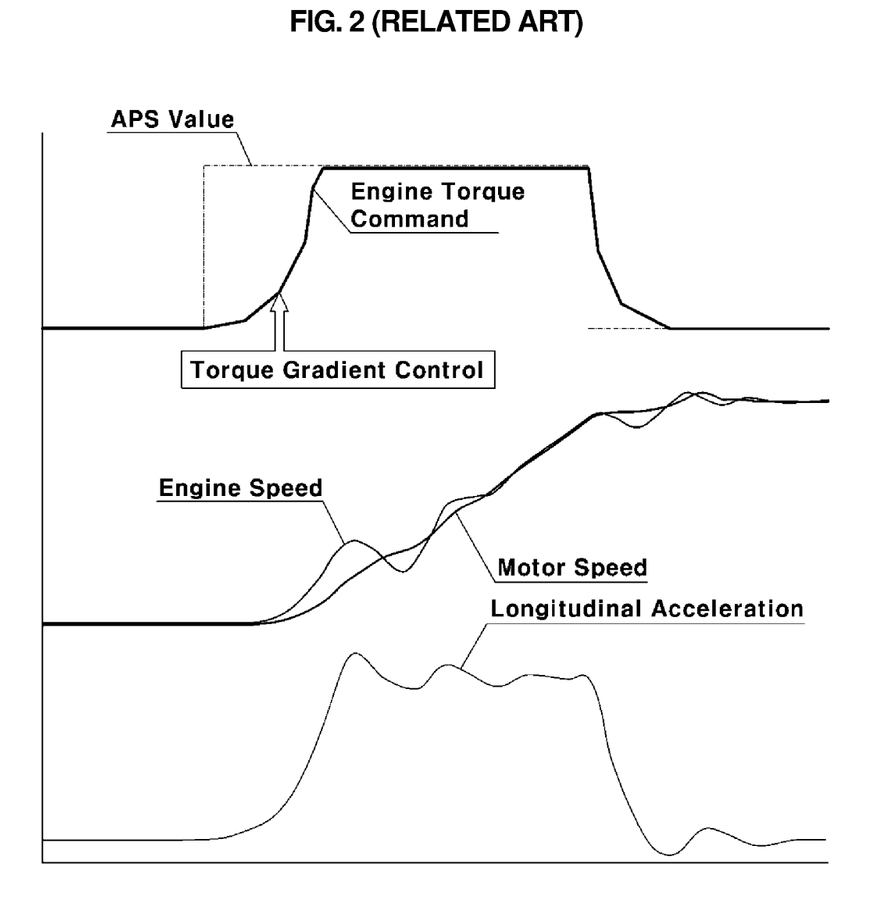
FIGS. 2 and 3 (RELATED ART) are views illustrating a control method of the related art by which torque gradient limitation is performed.
Figure 3:
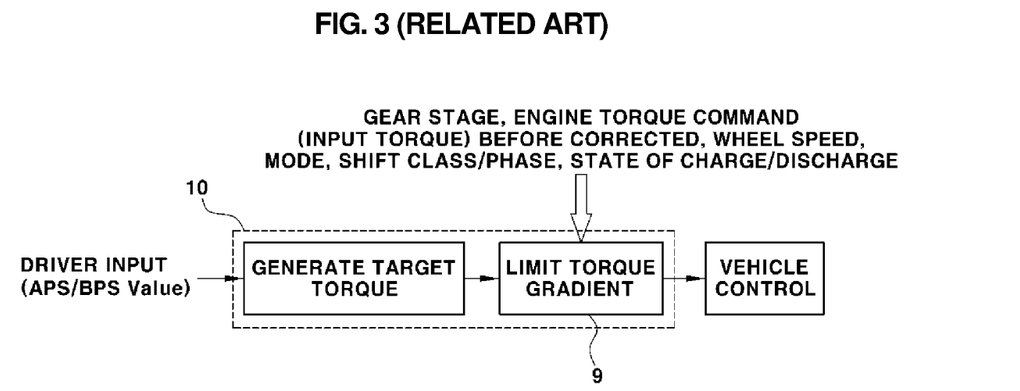

FIGS. 2 and 3 are views illustrating a control method of the related art by which torque gradient limitation is performed.

In FIGS. 2 and 3, APS and BPS indicate an acceleration position sensor and a brake pedal sensor, respectively.

As illustrated in FIG. 2, in a known method using torque gradient limitation, torque gradient control is performed using a rate limiter to provide a gentle rise in an engine torque command even in the case in which a driver suddenly manipulates the accelerator pedal (i.e., even in the case of a sudden rise in an APS value).

However, even in the case in which the torque gradient control is performed, there may be a difference between an engine speed and a motor speed due to the torsion of the drive shaft or the like.

In addition, since the above-described torque gradient control is performed, a gently-rising engine torque command is generated differently from the situation in which the accelerator pedal is suddenly pressed by the driver. Consequently, the operation of the engine is controlled by the gently-rising torque command, and a vehicle reaction of increasing acceleration (i.e., longitudinal acceleration) is slowed.

Referring to FIG. 3, a controller 10 controls the vehicle in response to a driving input (e.g., an APS value and a BPS value), such as manipulation of the accelerator pedal or the brake pedal by the driver. In particular, when a target torque for controlling an engine torque output is determined, a control process is performed such that a rate limiter 9 in the controller 10 limits the gradient of the engine torque command, depending on variables, such as a gear stage, an engine torque command before being corrected, a wheel speed, a mode, a shift class/phase, and a state of charge/discharge of the motor.

When the torsion of the damper is only calculated based on the difference between the engine speed and the motor speed, there occurs a lag or time delay between a point in time at which the torsion is measured and a point in time at which the engine torque and the motor torque follow the command to reduce the torsion.

Accordingly, the effect of reducing the torsion may be insignificant or the torsion may be unintentionally increased due to a phase difference. To overcome such problems, it is necessary to estimate the amount of torsion in advance by considering the time delay.

In addition, except for NVH problems caused by disturbances, most NVH problems in the drive system are caused by the backlash and torsion of the drive shaft due to a gap in gear engagement in the drive system. Accordingly, a control method for reducing the backlash-induced problems, i.e., a backlash-reducing control method, is demanded.

When the gradient of the torque command is controlled such that the torque command changes as most gentle and slowest as possible in response to the accelerator pedal being manipulated by the driver, the NVH problems in the drive system, due to the backlash or torsion, can be removed to some extent.

However, the gentle and slow change in torque as described above may not provide a rapid response, thereby increasing the difference between the vehicle behavior expected by the driver and the actual vehicle behavior. This may cause a lag or delay in acceleration or deceleration response, thereby degrading drivability.

Referring to FIG. 2, it can be appreciated that, even in the case in which the driver suddenly presses the accelerator pedal (i.e., even in the case of a sudden rise in the APS value), the engine torque command increases at a gentle gradient and the vehicle acceleration (i.e., longitudinal acceleration) increases with a time delay after the acceleration pedal was pressed.

To overcome this trade-off relationship between the response of the vehicle and the NVH problems caused by a significant change in driving force, in the related art, additional work of experimentally discovering a torque gradient value and a filter constant optimized for every situation has been required for application of the rate limiter or the filter. At this time, the entirety of variables, such as a gear stage, an engine torque (or a torque command), a wheel speed, a mode, a shift class/phase, and a state of charge/discharge of the motor, must be considered.

Accordingly, to overcome the above-described problems, the present disclosure proposes a method of generating an engine torque command based on the torsion of the drive system, the method enabling an optimum torque command for overcoming the NVH problems to be generated in real time.

Hereinafter, a driving torque command generating apparatus and method according to the present disclosure will be described in more detail with reference to the drawings.

Figure 4:
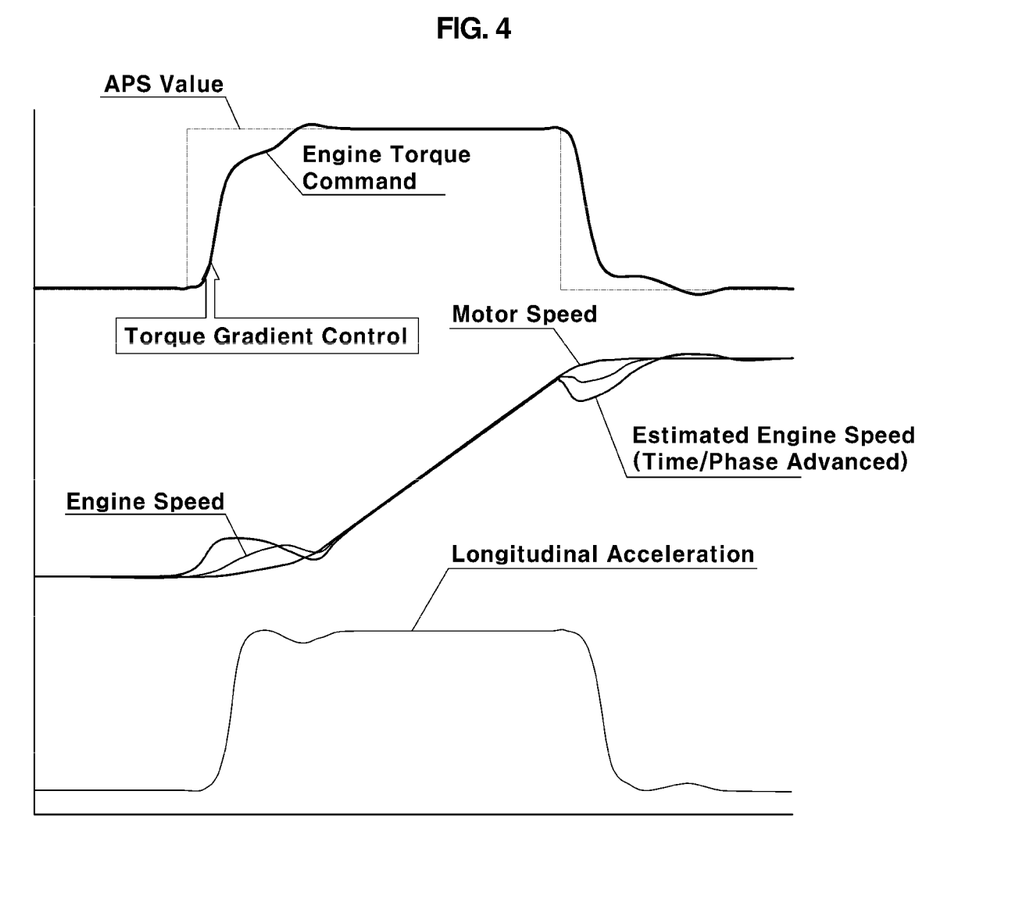
FIGS. 4 and 5 are views illustrating a feedback control method using a driving torque command generated according to the present disclosure.
Figure 5:
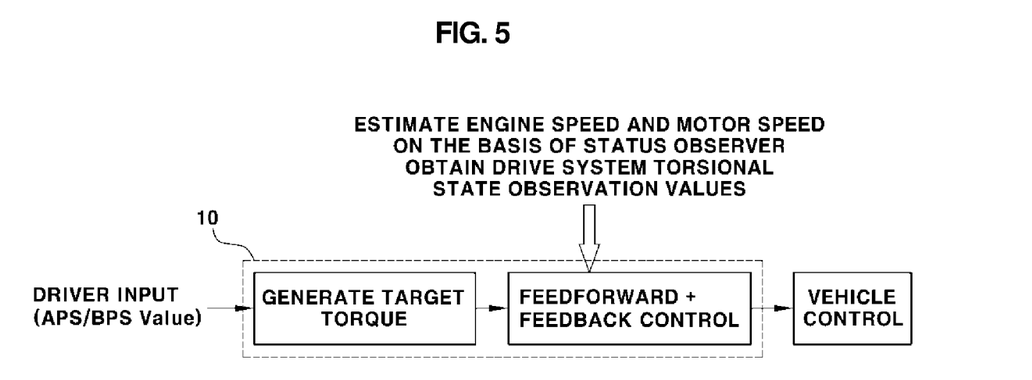
Figure 6:
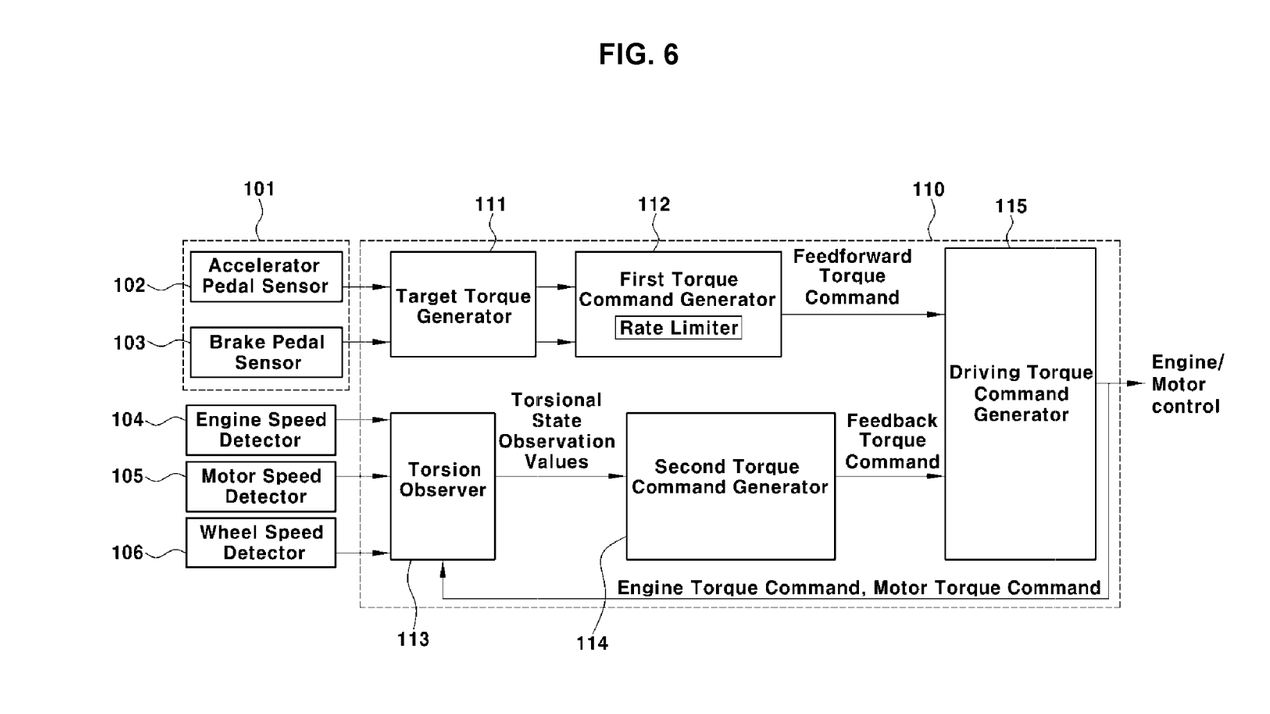
FIG. 6 is a block diagram illustrating a configuration of a driving torque command generating apparatus according to the present disclosure.

FIGS. 4 and 5 are views illustrating a feedback control method using a driving torque command generated according to the present disclosure, while FIG. 6 is a block diagram illustrating a configuration of a driving torque command generating apparatus according to the present disclosure.

Figure 7:
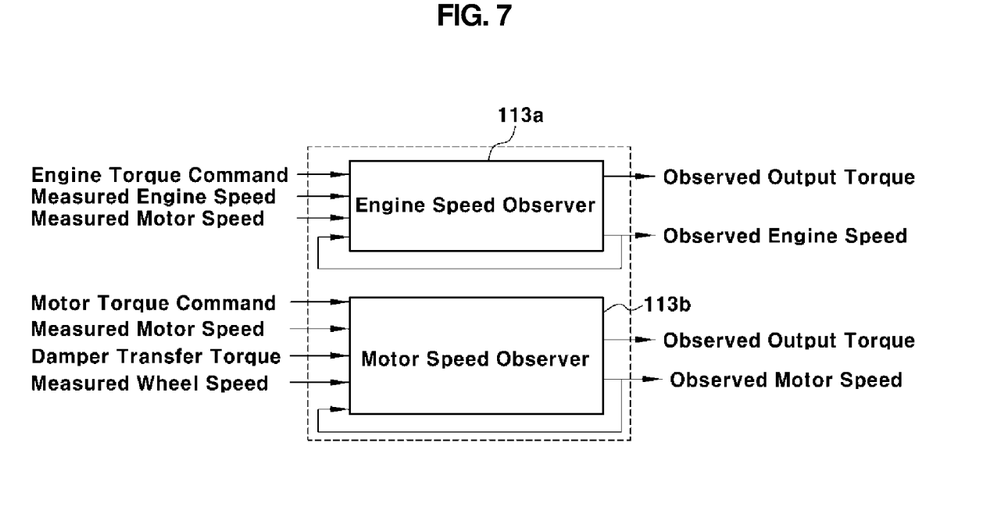
FIG. 7 is a block diagram illustrating an engine speed observer and a motor speed observer of a torsion observer in the driving torque command generating apparatus according to the present disclosure.

In addition, FIG. 7 is a block diagram illustrating an engine speed observer and a motor speed observer of a torsion observer in the driving torque command generating apparatus according to the present disclosure.

The driving torque command generating apparatus according to the present disclosure includes: a driving input detector 101 detecting a driving input value when the driver has input a driving input to the vehicle; an engine speed detector 104 detecting an engine speed; a motor speed detector 105 detecting a motor speed; a wheel speed detector 106 detecting a wheel speed; and a controller 110 obtaining torsional state observation values, i.e., values obtained by observing the torsional state of the vehicle drive system, using information regarding the engine speed, the motor speed, and the wheel speed detected and input by the engine speed detector 104, the motor speed detector 105, and the wheel speed detector 106, respectively, and generating a driving torque command based on the driving input value input by the driving input detector 101 and the torsional state observation values.

The driving torque command includes an engine torque command and a motor torque command.

The driving input detector 101 may include a typical accelerator pedal sensor (APS) 102 and a brake pedal sensor (BPS) 103, which are typical sensors detecting an accelerator pedal input value and a brake pedal input value of the driver.

Here, the driving input value includes pedal input values of the driver in response to the accelerator pedal and the brake pedal being manipulated by the driver, i.e., an APS value and a BPS value indicating pedal positions, displacements of pedal manipulation, and the like.

The APS value and the BPS value indicate signal values (or sensor values) represented by electrical signals (or sensor signals) output by the sensors, i.e., the APS and the BPS.

The engine speed detector 104 detecting the engine speed may be a typical sensor detecting the number of revolutions of the engine, e.g., an engine revolution per minute (RPM) sensor. The motor speed detector 105 detecting the motor speed and the wheel speed detector 106 detecting the wheel speed may be a resolver disposed on the motor and a wheel speed sensor disposed on a vehicle wheel, respectively, in a typical HEV.

In addition, the controller 110 may be a hybrid control unit (HCU) mounted on the HEV.

The controller 110 includes a target torque generator 111 receiving the driving input value of the driver, i.e. the APS signal value and the BPS signal value, detected by the driving input detector 101. The target torque generator 111 generates a target torque, with which the engine and the motor are to be controlled, from the detected driving input value, and outputs the target torque generated as above.

Here, the target torque includes a target engine torque and a target motor torque, which are optimized when controlling the engine and the motor, respectively. The target torque is determined depending on the driving input value of the driver.

In addition, the controller 110 further includes a first torque command generator 112 determining a torque gradient based on current vehicle status information collected from the vehicle, and generating and outputting a feedforward torque command from the target torque generated and output by the target torque generator 111, the feedforward torque command being a torque value limited to vary at the torque gradient determined as above.

Here, the first torque command generator 112 includes a rate limiter 112a to limit and control the torque gradient.

When the torque gradient according to the vehicle status information is determined by the rate limiter 112a, a torque value varying at the determined torque gradient is determined from the target torque output by the target torque generator 111 and is output as a feedforward torque command.

Here, the first torque command generator 112 determines an engine torque value and a motor torque value varying at the determined torque gradient using the target torque input by the target torque generator 111, i.e., the target engine torque and the target motor torque, as inputs, and outputs the engine torque value and the motor torque value as the feedforward torque command.

Thus, the feedforward torque command includes a feedforward engine torque command with which the target engine torque is gradient-limited by the rate limiter 112a and a feedforward motor torque command with which the target motor torque is gradient-limited by the rate limiter 112a.

The vehicle status information, i.e., variables, with which the torque gradient (i.e., the gradient of the torque command) is determined by the rate limiter 112a, may be implemented using the gear stage and the wheel speed. The torque gradient may be determined based on the gear stage and the wheel speed.

According to the present disclosure, the rate limiter is not limited to any limiter using a specific method to limit and control the torque gradient as long as the rate limiter can control the torque gradient depending on variables to some extent. A known rate limiter or a modified rate limiter, having variables or the like simplified in consideration of conditions of the vehicle or conditions of the controller, may be used.

The controller 110 further includes a torsion observer 113 receiving the engine speed, the motor speed, and the wheel speed detected by the engine speed detector 104, the motor speed detector 105, and the wheel speed detector 106, respectively, as well as a motor torque command generated by a driving torque command generator 115 in a previous period, which will be described later, and generating and outputting the torsional state observation values by observing (or estimating) the torsional state of the vehicle drive system from the engine speed, the motor speed, and the wheel speed, detected as above, as well as the driving torque command.

The torsional state observation values according to the present disclosure include a torsional angular velocity, a torsional angular acceleration, and a torsion angle of the drive system, obtained from the detected engine speed, motor speed, and wheel speed, as well as the engine torque command and the motor torque command, fed back by driving torque command generators as input values.

The torsional state observation values observed from the drive system include torsional state observation values observed from the damper and torsional state observation values observed from the transmission. The torsional state observation values of the damper and the torsional state observation values of the transmission respectively include a torsional angular velocity, a torsional angular acceleration, and a torsion angle.

In addition, the controller further includes a second torque command generator 114 generating and outputting a feedback torque command to reduce the torsion of the vehicle drive system, based on the torsional state observation values output by the torsion observer 113, i.e., a status observer.

In addition, the controller 110 further includes the driving torque command generator 115 generating a final driving torque command from the feedforward torque command output by the first torque command generator 112 and the feedback torque command output by the second torque command generator 114.

Here, the driving torque command generator 115 generates the final driving torque command by correcting the feedforward torque command by a degree equal to the feedback torque command intended for torsion reduction.

The feedback torque command output by the second torque command generator 114 may include a feedback engine torque command, i.e., a first feedback torque command regarding the engine, and a feedback motor torque command, i.e., a second feedback torque command regarding the motor, like the feedforward torque command.

The feedback engine torque command and the feedback motor torque command are determined as commands with which an engine torque and a motor torque in the direction toward decreasing the torsion of the drive system, including the damper and the transmission, are generated. The driving torque command generator 115 determines the final driving torque command to be a sum of the feedforward torque command and the feedback torque command.

That is, the sum of the feedforward engine torque command output by the first torque command generator 112 and the feedback engine torque command output by the second torque command generator 114 is determined as the final engine torque command by the driving torque command generator 115.

In addition, the sum of the feedforward motor torque command output by the first torque command generator 112 and the feedback motor torque command output by the second torque command generator 114 is determined as the final motor torque command by the driving torque command generator 115.

Hereinafter, the components and processes of the driving torque command generating apparatus will further be described. When the driver manipulates the accelerator pedal or the brake pedal, the driving input value in response to the accelerator pedal or the brake pedal being manipulated by the driver is detected by the driving input detector 101. The driving input value detected by the driving input detector 101 is input to the controller 110 in real time.

During driving of the vehicle, the engine speed, the motor speed, and the wheel speed are detected by the engine speed detector 104, the motor speed detector 105, and the wheel speed detector 106, respectively. The detected engine speed, motor speed, and wheel speed are input to the controller 110 in real time.

The detected driving input value is input to the target torque generator 111 of the controller 110 to be used to generate a target torque. The detected engine speed, motor speed, and wheel speed are input to the torsion observer 113 of the controller 110 to be used to determine and generate torsional state observation values of the drive system (i.e., the damper and the transmission).

The process in which the target torque generator 111 generates the target torque based on the driving input value of the driver, according to an embodiment of the present disclosure, is not different from a known method performed in a typical HEV, in which a controller generates a target value of a motor torque according to a driving input value of a driver.

Since the above-described method of generating the target torque by the target torque generator 111 may be regarded as a technical feature known in the art, a detailed description thereof will be omitted herein.

In addition, the first torque command generator 112 generates a feedforward torque command to be a value determined according to a torque gradient, using the target torque generated by the target torque generator 111 as an input.

Accordingly, the feedforward torque command generated by the first torque command generator 112 is transferred to the driving torque command generator 115, in which the feedforward torque is used to generate a final motor torque command.

The torsion observer 113, i.e., a status observer of the controller 110, obtains the torsional state observation values using the engine speed, motor speed, and wheel speed, as well as the driving torque command generated in the previous period, fed back by the driving torque command generator 115 as input information.

As illustrated in FIG. 7, the torsion observer 113 may include an engine speed observer 113a observing the engine speed and a motor speed observer 113b observing the motor speed.

In the following description, an output value of the engine speed observer 113a, i.e., an engine speed observation value output by the engine speed observer 113a by observing the engine speed, will be referred to as an "observed engine speed," and an output value of the motor speed observer 113b, i.e., a motor speed observation value output by the motor speed observer 113b by observing the motor speed, will be referred to as an "observed motor speed."

In addition, in the following description, an engine speed detected by the engine speed detector 104 and a motor speed detected by the motor speed detector 105 will be referred to as a "measured engine speed" and a "measured motor speed," respectively, so that detected values (or measured values) are distinguished from observed values.

In addition, a wheel speed detected by the wheel speed detector 106 will be referred to as a "measured wheel speed."

The torsion observer 113 determines the torsional state observation values indicating the amount or degree of torsion by observing and estimating the torsional state based on the driving torque command (including the engine torque command and the motor torque command). In the process of observing and estimating the torsional state, the torsion observer 113 receives and uses the measured engine speed, the measured motor speed, and the measured wheel speed, which are real-time measurements, as well as the driving torque command (i.e., the engine torque command and the motor torque command) generated in the previous period, fed back by the driving torque command generator 115 as input information.

In particular, the engine speed observer 113a uses a speed observation value observed in a previous period as feedback information in order to observe a current engine speed. The engine speed observer 113a observes the current engine speed based on a model formula, using the observed engine speed observed in the previous period, i.e., the feedback information, as well as the actually-measured engine speed and the engine torque command, fed back by the driving torque command generator 115 as input information.

In addition, the engine speed observer 113a may further use the measured motor speed in order to observe the current engine speed.

Further, the engine speed observer 113a observes an output torque (i.e., an observed damper torque). The output torque observed by the engine speed observer 113a may be used as a damper transfer torque by the motor speed observer 113b.

In addition, the engine speed observer 113a observes the output torque using information, such as torsion damper stiffness, as will be described later.

In the following description, an output torque observed by the engine speed observer 113a will be referred to as an "observed output torque."

Likewise, the motor speed observer 113b uses a speed observation value, observed in a previous period, as the feedback information in order to observe a current motor speed. The motor speed observer 113b observes the current motor speed based on a model formula, using the observed motor speed observed in the previous period, i.e., the feedback information, as well as the actually-measured motor speed and wheel speed, the motor torque command, i.e., information fed back from the driving torque command generator 115, and the damper transfer torque.

The motor speed observer 113b may use the observed output torque, observed and output by the engine speed observer 113a, as the damper transfer torque.

In addition, the motor speed observer 113b observes the output torque using information, such as transmission drive system stiffness, as will be described later.

The following Formulas 1 to 5 are formulas used by the torsion observer 113 to observe and estimate the torsional state. Formulas 1 to 5 are model formulas previously input and set in the engine speed observer 113a and the motor speed observer 113b to be used to observe the engine speed and the motor speed.

$$\dot{\hat{\omega}}_s = \frac{1}{J_e}T_e - \frac{1}{J_e}\hat{T}_d + L_{d,p}(\omega_e - \hat{\omega}_e)$$ [Formula 1]

$$\dot{\hat{T}}_d = k_d(\omega_e - \omega_m)L_{d,i}(\omega_e - \hat{\omega}_e)$$ [Formula 2]

$$\dot{\hat{\omega}}_m = \frac{1}{J_m}(\hat{T}_d + T_m) - \frac{1}{J_m}\hat{T}_t + L_{t,p}(\omega_m - \hat{\omega}_m)$$ [Formula 3]

$$\dot{\hat{T}}_t = k_t(\omega_m - \omega_w^*) - L_{t,i}(\omega_m - \hat{\omega}_m)$$ [Formula 4]

$$\omega_w^* = \alpha \cdot r \cdot \omega_w$$ [Formula 5]

Herein, various symbols will be defined as follows:
$J_e$: Engine rotational inertia
$J_m$: Motor rotational inertia
$k_d$: Torsion damper stiffness
$k_t$: Transmission drive system stiffness
$\omega_e$: Measured engine speed
$\hat{\omega}_s$: Observed engine speed
$\omega_m$: Measured motor speed
$\hat{\omega}_m$: Observed motor speed
$T_e$: Engine torque command
$\hat{T}_d$: Observed damper torque
$T_m$: Motor torque command
$\hat{T}_t$: Observed output torque
$L_{d,p}$, $L_{t,p}$: Observer feedback P-gain
$L_{d,i}$, $L_{t,i}$: Observer feedback I-gain
r: Current gear ratio
α: Wheel speed offset correction factor
$\omega_w$: Measured wheel speed
$\omega_w^*$: Equivalent wheel speed In Formulas 1 to 5, the engine rotational inertia $J_e$, motor rotational inertia $J_m$, the torsion damper stiffness $k_d$, the transmission drive system stiffness $k_t$, the observer feedback P-gain $L_{d,p}$, $L_{t,p}$, the observer feedback I-gain $L_{d,i}$, $L_{t,i}$, and the like are set pieces of information previously input and stored in the observers.

The engine speed observer 113a can observe the engine speed $\hat{\omega}_e$, based on Formulas 1 and 2. Here, the observed engine speed $\hat{\omega}_e$ observed in the previous period, as well as the engine torque command $T_e$, fed back by the driving torque command generator 115 as an input value, and the measured engine speed $\omega_e$ detected by the engine speed detector 104, is used as the feedback information as in Formula 1. In this manner, the engine speed is observed, with the observed engine speed $\hat{\omega}_e$, i.e., a currently observed value, being maintained not to diverge from the measured engine speed $\omega_e$.

Here, the engine speed $\hat{\omega}_e$ may be observed and estimated using the value of the command $T_e$ input from driving torque command generator 115, instead of using an actual engine torque value as an input.

Here, the observed engine speed (i.e., engine speed observation value) may be defined to be a difference between the measured engine speed (i.e., engine speed measurement) and the measured motor speed (i.e., motor speed measurement), as required.

In addition, the engine speed observer 113a uses a difference between the measured engine speed $\omega_e$ and the observed engine speed $\hat{\omega}_e$ as a feedback term of integration, as in Formula 2, in order to observe the output torque (or observed damper torque) $\hat{T}_d$. A model using the torsion damper stiffness $k_d$ is used as a feedforward term in order to improve observation response. Here, as seen from Formula 2 and FIG. 7, the measured motor speed $\omega_m$, as well as the measured engine speed $\omega_e$, may be used.

Referring to Formula 1 above, it can be appreciated that the engine speed observer 113a uses the output torque, i.e., the observed damper torque $\hat{T}_d$, to determine the observed engine speed $\hat{\omega}_e$.

The motor speed observer 113b can observe the motor speed $\hat{\omega}_m$ based on Formulas 3 and 4. To observe the current motor speed $\hat{\omega}_m$, the motor torque command $T_m$, fed back by the driving torque command generator 115 as an input value, the measured motor speed $\omega_m$ detected by the motor speed detector 105, the measured wheel speed $\omega_w$ detected by the wheel speed detector 106, and the observed motor speed $\hat{\omega}_m$ observed in the previous period are used as the feedback information. In addition, the damper transfer torque is used as an input.

The motor speed observer 113b uses the observed motor speed $\hat{\omega}_m$, observed in the previous period, as the feedback information in order to observe the motor speed while maintaining the currently observed motor speed $\hat{\omega}_m$ not to diverge from the actually measured motor speed $\omega_m$.

The motor speed observer 113b uses the observed output torque (i.e., the observed damper torque) $\hat{T}_d$, obtained by the engine speed observer 113a, as the damper transfer torque, as described above.

In addition, the motor speed $\hat{\omega}_m$ is observed and estimated using the value of the command $T_m$, generated by the driving torque command generator 115, as an input from the motor speed observer 113b, instead of using an actual motor torque value as the input.

In addition, a difference between the measured motor speed $\omega_m$ and the observed motor speed $\hat{\omega}_e$ is used as a feedback term of integration, as in Formula 4, so that the output torque (or observed output torque) $\hat{T}_t$ is observed by the motor speed observer 113b. A model using the transmission drive system stiffness $k_t$ is used as a feedforward term in order to improve observation response. As appreciated from Formula 4, the equivalent wheel speed $\omega_w^*$ obtained from the measured wheel speed $\omega_w$ can be used together with the measured motor speed $\omega_m$.

Here, the equivalent wheel speed $\omega_w^*$ may be defined to be an equivalent speed at the motor, obtained by converting the measured wheel speed $\omega_w$ to a speed at the motor using a gear ratio corresponding to the current gear stage.

Referring to Formula 3, it can be appreciated that the motor speed observer 113b uses the output torque, i.e., the observed output torque $\hat{T}_e$, to determine the observed motor speed $\hat{\omega}_m$.

Here, the observed motor speed (i.e., motor speed observation value) may be defined to be a difference between the measured motor speed (i.e., motor speed observation value) and the equivalent wheel speed, as required.

Formula 5 above is a formula for calculating the equivalent wheel speed $\omega_w^*$, which may be calculated from the measured wheel speed $\omega_w$ using the current gear ratio r and the wheel speed offset correction factor $\alpha$.

The measured wheel speed $\omega_w$ may be obtained based on the driving wheels of the vehicle or may be obtained by correcting a deviation between a left wheels and a right wheel or a deviation between a front wheel and a rear wheel.

For example, the measured wheel speed $\omega_w$ may be an average speed of a left wheel speed and a right wheel speed or an average speed of a front wheel speed and a rear wheel speed.

In addition, the wheel speed used by the torsion observer 113 of the controller 110 may be the equivalent wheel speed $\omega_w^*$ on the motor, i.e., a wheel speed from the point of view of the motor, calculated in consideration of the motor-wheel gear ratio r after the deviation between the left wheel and the right wheel or the deviation between the front wheel and the rear wheel is corrected.

That is, as represented by Formula 5, the equivalent wheel speed $\omega_w^*$ may be calculated by multiplying the measured wheel speed $\omega_m$ detected by the wheel speed detector 105 by the motor-wheel gear ratio r and the wheel speed offset correction factor $\alpha$. The equivalent wheel speed $\omega_w^*$ calculated in this manner may be used in Formula 4.

Since the motor-wheel gear ratio r reflects a gear ratio of the transmission, i.e., the gear ratio of the current shift stage, in the case of a vehicle provided with an ordinary transmission having a fixed number of gear ratios, the equivalent wheel speed $\omega_w^*$ is a wheel speed converted in consideration of the current shift stage of the transmission while being equivalent to the motor speed.

The wheel speed offset correction factor $\alpha$ is a correction factor intended to cope with an insignificant variation in an actual gear ratio, occurring due to wear or replacement of a tire, and reflect an insignificant variation in the gear ratio.

The wheel speed offset correction factor $\alpha$ has an initial value 1. The wheel speed offset correction factor $\alpha$ is obtained by averaging and integrating differences between the observed motor speed and the equivalent wheel speed over time, starting with the initial value 1.

However, any difference obtained during gear shifting as in a case in which the shifting status of the transmission is in an actual transmission range or obtained during motor-wheel slip, such as a creeping state of the vehicle, will be omitted.

In addition, the torsion observer 113 of the controller 110 estimates and observes the torsional state of the drive system (i.e., the damper and the transmission) based on the observed speed obtained by a calculation process according to Formulas 1 to 5.

The torsional state observation values of the drive system are determined from the observed engine speed $\hat{\omega}_e$, obtained by the engine speed observer 113a, the observed motor speed $\hat{\omega}_m$ obtained by the motor speed observer 113b, and the equivalent wheel speed $\omega_w^*$.

Here, the torsional state observation values of the damper are determined by the observed engine speed $\hat{\omega}_e$ and the observed motor speed $\hat{\omega}_m$, while the torsional state observation values of the transmission are determined by the observed motor speed $\hat{\omega}_m$ and the equivalent wheel speed $\omega_w^*$.

The torsional state observation values of the damper and the torsional state observation values of the transmission respectively include a torsional angular velocity (or torsional speed), a torsional angular acceleration, and a torsion angle. A difference between the observed engine speed $\hat{\omega}_e$ and the observed motor speed $\hat{\omega}_m$ is the torsional angular velocity among the torsional state observation values of the damper.

In addition, a difference between the observed motor speed $\hat{\omega}_m$ and the equivalent wheel speed $\omega_w^*$ is the torsional angular velocity among the torsional state observation values of the transmission.

In addition, as seen from Formulas 1 to 4, not only the torsion angular velocity but also the torsional angular acceleration is observed. The torsion angle may be obtained by integrating the observed torsional angular velocity.

As described above, the torsional angular velocity, torsional angular acceleration, and torsion angle of the drive system (i.e., the damper and the transmission) obtained by the torsion observer 113 are the torsional state observation values obtained by observing (or estimating) the torsional state of the drive system using the measured engine speed, measured motor speed, and measured wheel speed, as well as the driving torque command (including the engine torque command and the motor torque command). These torsional state observation values are input to the second torque command generator 114.

The second torque command generator 114 sets a sum of products of the torsional state observation values and control gains as a feedback torque command.

That is, the second torque command generator 114 generates the feedback torque command corresponding to the torsional state, based on the torsional angular velocity, the torsional angular acceleration, and the torsion angle on the drive system (i.e., the damper and the transmission), by summing the products obtained by multiplying the torsional angular velocity, the torsional angular acceleration, and the torsion angle by respective predetermined control gains, and setting the sum as the feedback torque command.

Here, the sum of products obtained by multiplying the torsional angular velocity, the torsional angular acceleration, and the torsion angle on the damper by respective control gains is determined as the feedback engine torque command.

In addition, the sum of products obtained by multiplying the torsional angular velocity, the torsional angular acceleration, and the torsion angle on the transmission by respective control gains is determined as the feedback motor torque command.

The feedback engine torque command and the feedback motor torque command determined by the second torque command generator 114, as described above, are input to the driving torque command generator 115. The driving torque command generator 115 receives the feedforward torque command output by the first torque command generator 112 and the feedback torque command output by the second torque command generator 114, and generates the final driving torque command from the feedforward torque command and the feedback torque command input thereto.

Here, the driving torque command generator 115 generates the engine torque command to be a sum of the feedforward engine torque command and the feedback engine torque command and the motor torque command to be a sum of the feedforward motor torque command and the feedback motor torque command.

That is, the feedforward torque command determined based on the driving input value of the driver and the feedback torque command determined based on the torsional state observation values are summed, and the sum is determined as the driving torque command (including the engine torque command and the motor torque command).

Consequently, the engine torque command finally determined by the driving torque command generator 115 is input to an engine control unit (ECU, not shown), which in turn uses the engine torque command to control the operation of the engine.

In addition, the motor torque command finally determined by the driving torque command generator 115 is input to a motor control unit (MCU, not shown), which in turn uses the motor torque command to control the operation of the motor.

As set forth above, an embodiment in which the sum of the products obtained by multiplying the torsional angular velocity, torsional angular acceleration, and torsion angle on the damper by the respective control gains is determined as the feedback engine torque command and the sum of the products obtained by multiplying the torsional angular velocity, torsional angular acceleration, and torsion angle on the transmission by the respective control gains is determined as the feedback motor torque command has been described.

This embodiment provides a method of controlling the torsional values (i.e., the torsional state observation values) observed from the damper and the transmission to act as torque feedback information for the engine and the motor. According to this method, the feedback control input (i.e., the first feedback torque command) calculated from the torsion of the damper is basically applied in the direction toward limiting the engine torque, and the feedback control input (i.e., the second feedback torque command) calculated from the torsion of the transmission is applied in the direction of limiting the motor torque.

In other words, according to the foregoing embodiment, the driving torque command generator 115 generates the final engine torque command by correcting the feedforward engine torque command, generated by the first torque command generator 112, by a degree equal to the first feedback torque command, and generates the final motor torque command by correcting the feedforward motor torque command, generated by the second torque command generator 114, by a degree equal to the second feedback torque command.

According to another embodiment, the driving torque command generator 115 may calculate the final motor torque command by adding all of the feedback torque commands output by the second torque command generator 114 to the feedforward motor torque generated and output by the first torque command generator 112.

That is, both the feedback torque command obtained by summing the products of the torsional angular velocity, torsional angular acceleration, and torsion angle on the damper multiplied by the respective control gains and the feedback torque command obtained by summing the products of the torsional angular velocity, torsional angular acceleration, and torsion angle on the transmission multiplied by the respective control gains are added to the feedforward motor torque.

Here, the feedforward engine torque generated and output by the first torque command generator 112 is determined as the final engine torque command by the driving torque command generator 115.

In addition, according to the present embodiment, the feedback control input (i.e., feedback torque command) calculated from the torsion value of the damper may be applied in the direction toward assisting the motor torque, and the feedback control input (i.e., the feedback torque command) calculated from the torsion value of the transmission may be applied in the direction toward limiting the motor torque.

This method causes respectively-observed torsion values (on the damper and the transmission) to only act as feedback of the motor torque.

In summary, according to the present embodiment, the driving torque command generator 115 corrects the feedforward motor torque command generated by the first torque command generator 112, using the first feedback torque command and the second feedback torque command, and generates the corrected result as the final motor torque command. Instead, the final engine torque command is determined to be the feedforward engine torque command generated by the first torque command generator 112.

According to a further embodiment, like the foregoing embodiment, respectively-observed torsion values are caused to only act as feedback of the motor torque. A feedback torque may be applied within an allowed amount of the capacity of the motor while an excessive amount of the torque may be applied in the direction toward limiting the engine torque.

That is, the driving torque command generator 115 corrects the feedforward motor torque command generated by the first torque command generator 112, using the first feedback torque command the second feedback torque command, and generates the corrected value as the final motor torque command. The final motor torque command is limited such that the final motor torque command is within a preset allowed amount of the motor capacity. Instead, the feedforward engine torque command is corrected by an excessive amount of the first feedback torque command or an excessive amount of the second feedback torque command exceeding the allowed amount. In this manner, the corrected command value is determined as the final engine torque command.

In addition, when a motor (e.g., the starter-generator (MG2) 15 in FIG. 1), other than the driving motor, is connected to the engine directly or via a belt, in all situations, a portion corresponding to the engine torque command feedback, i.e., the feedback engine torque command, may be a torque command with which the other motor is controlled.

In addition, when a motor (e.g., the starter-generator (MG2) 15 in FIG. 1), other than the driving motor, is connected to the engine directly or via a belt, in all situations, one of the first feedback torque command, the second feedback torque command, and a combination thereof may be a compensation torque command with which the other motor is controlled.

Further, compensation control may be performed by distributing the compensation torque command to a plurality of motors (e.g., MG1 and MG2 in FIG. 1).

As set forth above, according to embodiments of the present disclosure, the driving torque command generating apparatus and method of an HEV can obtain rapid reaction of a vehicle in response to the driving input of the driver (e.g., manipulation of the accelerator pedal by the driver)

while effectively reducing NVH problems caused by torsion and backlash of the drive system even in the case in which a significant change in driving force is caused by the driving input.

In addition, according to embodiments of the present disclosure, in the case of overcoming NVH problems caused by torsion and backlash of the drive system, it is possible to overcome the difficulty in setting the torque command filter or torque gradient in a situation-specific manner by considering a number of factors, as well as the excessive number of process steps, which are the problems of the related-art solutions using the rate limiter or the filter. In addition, since a torque command suitable for a specific point in time can be generated in real time, an improvement in efficiency can be expected.

In particular, according to embodiments of the present disclosure, it is possible to generate a driving torque command by previously observing a result of backlash or vibration of the drive system depending on a change in torque before the torque is actually generated, thereby effectively reducing NVH problems even in the case in which a unique control delay time is present in the engine or the motor.

Although the exemplary embodiments of the present disclosure have been described for illustrative purposes, the scope of the present disclosure is not limited thereto. It should be understood that those skilled in the art will appreciate various modifications and improvements without departing from the scope and spirit of the present disclosure as disclosed in the accompanying claims.

What is claimed is:

1. A driving torque command generating apparatus of a hybrid electric vehicle, the apparatus comprising:
    a driving input detector detecting a driving input value of a driver, including a pedal input value in response to manipulation of an accelerator pedal;
    an engine speed detector detecting an engine speed of an engine of a vehicle;
    a motor speed detector detecting a motor speed of a motor functioning as a driving source of the vehicle;
    a wheel speed detector detecting a wheel speed of a wheel of the vehicle; and
    a controller obtaining torsional state observation values of a vehicle drive system using the measured engine speed, the measured motor speed, and a measured wheel speed detected by the engine speed detector, the motor speed detector, and the wheel speed detector, respectively, together with a motor torque command generated in a previous period, and generating an engine torque command and a motor torque command of a driving torque command in a current period based on the driving input value input by the driving input detector and the torsional state observation values,
    wherein the torsional state observation values in the vehicle drive system comprise:
        torsional state observation values on a damper, obtained by observing a torsional state of the damper between the engine and the motor; and
        torsional state observation values on a transmission, obtained by observing a torsional state of the transmission located on an output side of the motor,
    wherein the torsional state observation values on the damper comprise a torsional angular velocity, a torsional angular acceleration, and a torsion angle on the damper,
    wherein the torsional state observation values on the transmission comprise a torsional angular velocity, a torsional angular acceleration, and a torsion angle on the transmission,
    wherein the torsional angular velocity on the damper is determined by a difference between the observed engine speed and the observed motor speed, and
    wherein the torsion angle on the damper is determined by integrating the torsional angular velocity on the damper.

2. The apparatus according to claim 1, wherein the controller comprises:
    a target torque generator generating a target engine torque and a target motor torque, with which the engine and the motor are controlled, from the driving input value input by the driving input detector;
    a first torque command generator generating a feedforward engine torque command and a feedforward motor torque command from the target engine torque and the target motor torque, using a torque gradient determined based on vehicle status information;
    a torsion observer generating the torsional state observation values by observing a torsional state of the vehicle drive system, from the measured engine speed, the measured motor speed, and the measured wheel speed, together with the motor torque command generated in the previous period by a driving torque command generator;
    a second torque command generator generating a feedback torque command, with which torsion of the vehicle drive system is reduced, based on the torsional state observation values generated by the torsion observer; and
    the driving torque command generator generating the engine torque command and the motor torque command from the feedforward engine torque command and the feedforward motor torque command generated by the first torque command generator and the feedback torque command generated by the second torque command generator.

3. The apparatus according to claim 2, wherein the driving torque command generator generates the engine torque command and the motor torque command by correcting the feedforward engine torque command and the feedforward motor torque command by the feedback torque command, with which torsion of the vehicle drive system is reduced.

4. The apparatus according to claim 2, wherein the torsion observer comprises:
    an engine speed observer observing the engine speed based on the measured engine speed, an observed engine speed observed in the previous period and received as feedback information, and an engine torque command of the previous period generated by the driving torque command generator; and
    a motor speed observer observing the motor speed based on the measured motor speed, an observed motor speed observed in the previous period and received as feedback information, and a motor torque command of the previous period generated by the driving torque command generator,
    wherein the torsional state observation values are determined from an observed engine speed observed by the engine speed observer and an observed motor speed observed by the motor speed observer.

5. The apparatus according to claim 1, wherein the torsional angular velocity on the transmission is determined to be a difference between the observed motor speed and the equivalent wheel speed, the torsion angle on the transmission is calculated by integrating the torsional angular velocity on the transmission, and the equivalent wheel speed is obtained by converting the measured wheel speed to a speed on the motor using the gear ratio corresponding to the current gear stage.

6. The apparatus according to claim 1, wherein the second torque command generator generates a first feedback torque command to be a sum of products of the torsional angular velocity, the torsional angular acceleration, and the torsion angle on the damper, which are the torsional state observation values on the damper, multiplied with respective predetermined control gains, and generates a second feedback torque command to be a sum of products of the torsional angular velocity, the torsional angular acceleration, and the torsion angle on the transmission, which are the torsional state observation values on the transmission, multiplied with respective predetermined control gains.

7. The apparatus according to claim 6, wherein the driving torque command generator generates a final engine torque command by correcting the feedforward engine torque command, generated by the first torque command generator, using the first feedback torque command, and generates a final motor torque command by correcting the feedforward motor torque command, generated by the second torque command generator, using the second feedback torque command.

8. The apparatus according to claim 6, wherein the driving torque command generator generates a final motor torque command by correcting the feedforward motor torque command, generated by the first torque command generator, using the first feedback torque command and the second feedback torque command, and determines the feedforward engine torque command, generated by the first torque command generator, as a final engine torque command.

9. The apparatus according to claim 6, wherein the driving torque command generator generates a final motor torque command by correcting the feedforward motor torque command, generated by the first torque command generator, using the first feedback torque command and the second feedback torque command,
wherein the final motor torque command is limited so that the final motor torque command is within a preset allowed amount of motor capacity, and the feedforward engine torque command is corrected by an excessive amount of the first feedback torque command or the second feedback torque command exceeding the allowed amount, so that a corrected command value is determined as the final engine torque command.

10. A driving torque command generating method of a hybrid electric vehicle, the method comprising:
detecting, by a driving input detector, a driving input value of a driver, including a pedal input value in response to manipulation of an accelerator pedal;
detecting, by an engine speed detector, an engine speed of an engine of a vehicle;
detecting, by a motor speed detector, a motor speed of a motor functioning as a driving source of the vehicle;
detecting, by a wheel speed detector, a wheel speed of a wheel of the vehicle; and
obtaining, by a controller, torsional state observation values of a vehicle drive system using the measured engine speed, the measured motor speed, and the measured wheel speed detected by the engine speed detector, the motor speed detector, and the wheel speed detector, respectively, together with a motor torque command generated in a previous period; and
generating, by the controller, an engine torque command and a motor torque command of a driving torque command in a current period based on the driving input value input by the driving input detector and the torsional state observation values,
wherein the torsional state observation values in the vehicle drive system comprise:
torsional state observation values on a damper, obtained by observing a torsional state of the damper between the engine and the motor; and
torsional state observation values on a transmission, obtained by observing a torsional state of the transmission located on an output side of the motor,
wherein the torsional state observation values on the damper comprise a torsional angular velocity, a torsional angular acceleration, and a torsion angle on the damper,
wherein the torsional state observation values on the transmission comprise a torsional angular velocity, a torsional angular acceleration, and a torsion angle on the transmission,
wherein the torsional angular velocity on the damper is determined by a difference between the observed engine speed and the observed motor speed, and
wherein the torsion angle on the damper is determined by integrating the torsional angular velocity on the damper.

11. The method according to claim 10, wherein the process of obtaining, by the controller, the torsional state observation values comprises:
observing, by the engine speed observer, the engine speed based on the measured engine speed, an observed engine speed observed in the previous period and received as feedback information, and an engine torque command of the previous period;
observing, by the motor speed observer, the motor speed based on the measured motor speed, an observed motor speed observed in the previous period and received as feedback information, and a motor torque command of the previous period; and
determining the torsional state observation values from an observed engine speed observed by the engine speed observer and an observed motor speed observed by the motor speed observer.

12. The method according to claim 10, wherein the torsional angular velocity on the transmission is determined to be a difference between the observed motor speed and the equivalent wheel speed, the torsion angle on the transmission is calculated by integrating the torsional angular velocity on the transmission, and the equivalent wheel speed is obtained by converting the measured wheel speed to a speed on the motor using the gear ratio corresponding to the current gear stage.

13. The method according to claim 10, wherein the process of generating, by the controller, the engine torque command and the motor torque command comprises:
generating a target engine torque and a target motor torque, with which the engine and the motor are controlled, from the driving input value input by the driving input detector;
generating a feedforward engine torque command and a feedforward motor torque command from the target engine torque and the target motor torque, using a torque gradient determined based on vehicle status information;

generating a feedback torque command, with which torsion of the vehicle drive system is reduced, based on the torsional state observation values; and generating the engine torque command and the motor torque command from the feedforward engine torque command and the feedforward motor torque command and the feedback torque command.

14. The method according to claim 13, wherein the controller generates the engine torque command and the motor torque command by correcting the feedforward engine torque command and the feedforward motor torque command by the feedback torque command, with which torsion of the vehicle drive system is reduced.

* * * * *